July 31, 1956 K. W. DERR 2,756,559
AUTOMATIC WATCH MAINSPRING WINDING MECHANISM
Filed April 3, 1952
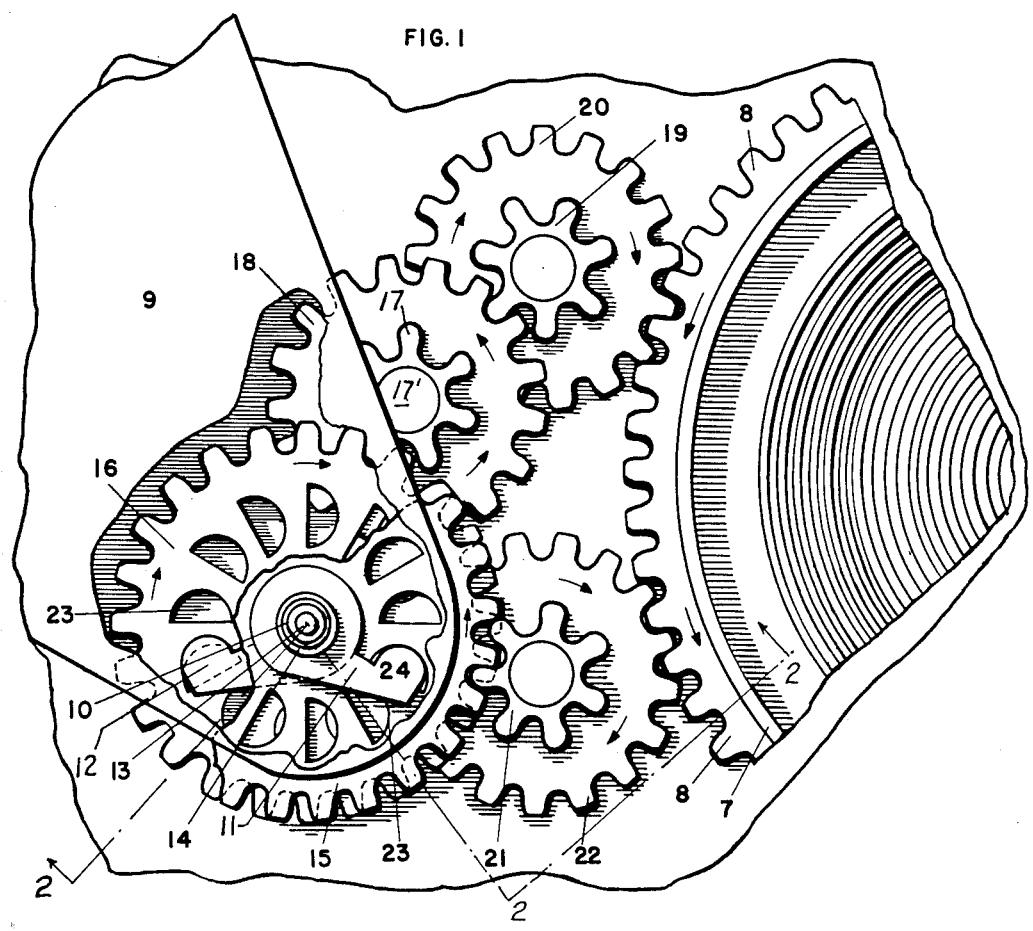
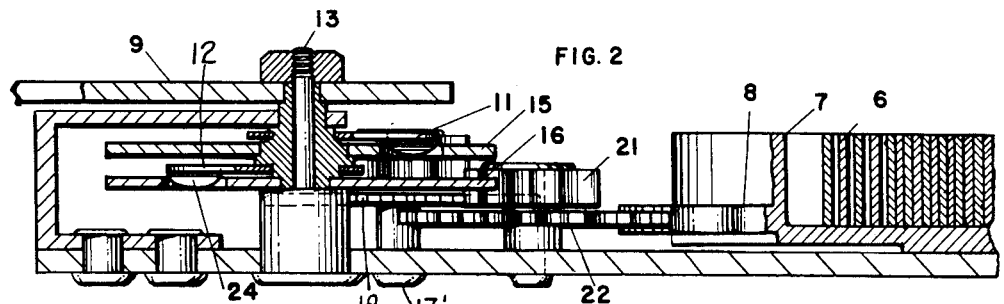
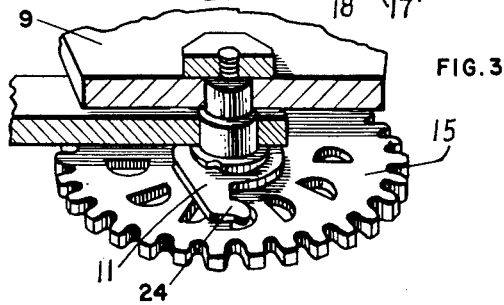
INVENTOR
KENNETH W. DERR
BY
ATTORNEY United States Patent Office 2,756,559
Patented July 31, 1956

2,756,559
AUTOMATIC WATCH MAINSPRING WINDING MECHANISM

Kenneth W. Derr, Quarryville, Pa., assignor to Hamilton Watch Company, Lancaster, Pa.

Application April 3, 1952, Serial No. 280,325

2 Claims. (Cl. 58—82)

This invention relates to an automatic winding mechanism of the type for use in watches where a pivoted swinging weight is used to wind a mainspring.

It is the object of this invention to provide a mechanical winding mechanism for watch mainsprings in which a pivoted weight will actuate a series of gears, winding the mainspring during any movement of the weight.

It is a further object of the present invention to provide a mechanism which may be made economically and which is not complicated by the use of hard to manufacture parts.

It is a still further object of the present invention to provide a pair of spring pressed pawls acting upon a pair of gears mounted on the same shaft, each of said gears being free to turn in one direction and prevented from turning in one direction by the pawls, the gears being arranged to work oppositely so that movement of the weight in either direction would turn one of the gears.

The invention is illustrated in the accompanying drawing in which:

Figure 1 is a top plan view broken in part to show underlying pieces.

Figure 2 is a cross section on line 2—2 of Figure 1.

Figure 3 is a perspective view of the ratchet device, partly in cross section.

The invention which is here illustrated for convenience greatly enlarged is shown without the top plates which are necessary to provide bearings for the pivots. Certain details which may be necessary in the actual watch are omitted for the sake of clearness in illustrating the invention.

A mainspring 6 is mounted in a mainspring barrel 7 having annular teeth 8. A weight 9 is fixedly mounted on a sleeve 10 which carries a pair of spring finger pawls 11 and 12 also fixed thereto. This sleeve is mounted also on a shaft 13 for free rotation. Mounted on the sleeve 10 for free rotation are gears 15 and 16. The gear 15 meshes with a pinion 17 which rotates with a gear 18, both carried on the shaft 17'. The gear 18 in turn meshes with a pinion 19 which through its integral gear 20 meshes with the teeth 8 of the mainspring barrel. The gear 16 engages the pinion 21 which meshes with the teeth 8 of the mainspring barrel through its integral gear 22.

Referring particularly to Figure 3, the gear 15 is shown with a plurality of semicircular holes 23, while the pawl 11 is shown with a semicircular resilient lip 24. Rotation of the pawl in one direction causes the lip 24 to ride freely over the surface of the gear, while rotation in the other direction causes the resilient lip 24 to engage the edge of the semicircular openings and impart the motion of the pawl to the gear. The movement of pawl 12 with gear 16 is similar and for the purpose of clearness is not here shown in Figure 3.

In actual operation the weight 9 swinging about the shaft 13 turns the pawls 11 and 12 through their common sleeve 10 and when the weight is moving counterclockwise, the motion is imparted through the pawl 11 to the gear 15, the pawl 12 riding freely over the surface of the gear 16. In a like manner, when the weight is moving clockwise, the rotary motion of the pawl 12 is imparted to the gear 16 while the pawl 11 rides freely over the surface of the gear 15. It will thus be seen that movement of the weight in either direction imparts a winding motion to the mainspring through a simple easy to manufacture mechanism. The multiplicity and closeness of the holes 23 insure a winding motion being imparted to the mainspring barrel even though the weight has a very short arc.

What is claimed is:

1. An automatic winding mechanism for watches, comprising a weight, a sleeve pivotally supporting said weight for oscillation, a pair of gears mounted for independent rotation on said sleeve, each of said gears being formed with a plurality of semicircular openings, a pair of generally flat resilient pawls secured to and rotating with said sleeve, each of said pawls comprising a substantially radial arm terminating in a transversely extending rounded nose inclined to the plane of the pawl, the noses of the pawls resiliently engaging the wall of the semicircular openings in said gears, one of said pawls engaging one of the gears when rotating in a clockwise direction and riding freely over said gear when rotating in a counterclockwise direction, the other of said pawls engaging the other of said gears when riding in a counterclockwise direction and riding freely over said gear when rotating in a clockwise direction, a mainspring, a mainspring gear connected to said mainspring, gearing connecting one of the loosely mounted gears with said mainspring gear and other gearing connecting the other of said loosely mounted gears with said mainspring gear, whereby the oscillation of the weight in either direction will turn one of the loosely mounted gears through its cooperating pawl and through its respective gearing wind the mainspring gear.

2. In a pawl and ratchet drive mechanism, a staff, a sleeve carried by said staff and rotatable thereon, a pair of gears mounted for independent rotation on said sleeve, each of said gears being formed with a plurality of semicircular openings, a pair of generally flat resilient pawls secured to and rotating with said sleeve, each of said pawls comprising a substantially radial arm terminating in a transversely extending rounded nose inclined to the plane of the pawl, the noses of the pawls resiliently engaging the wall of the semicircular openings in said gears, one of said pawls engaging one of the gears when rotating in a clockwise direction and riding freely over said gear when rotating in a counterclockwise direction, the other of said pawls engaging the other of said gears when riding in a counterclockwise direction and riding freely over said gear when rotating in a clockwise direction, a third gear connected to mechanism to be driven in mesh with one of said loosely mounted gears, a fourth gear in mesh with the other of said loosely mounted gears and also in mesh with said mechanism driving gear, whereby oscillating motion of the sleeve is transmitted through the pawls and loosely mounted gears to circular motion in one direction of the mechanism driving gear.

References Cited in the file of this patent

FOREIGN PATENTS

| 170,938 | Switzerland | Nov. 1, 1934 |
| 254,002 | Switzerland | Dec. 1, 1948 |
| 260,634 | Switzerland | Aug. 1, 1949 |